United States Patent
Taguchi et al.

(10) Patent No.: US 10,295,681 B2
(45) Date of Patent: May 21, 2019

(54) RADIATION DETECTOR

(71) Applicant: Kabushiki Kaisha Toshiba, Minato-ku (JP)

(72) Inventors: Satomi Taguchi, Ota (JP); Atsushi Wada, Kawasaki (JP); Isao Takasu, Setagaya (JP); Naoto Kume, Yokohama (JP); Mitsuyoshi Kobayashi, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/692,040

(22) Filed: Aug. 31, 2017

(65) Prior Publication Data

US 2018/0156930 A1 Jun. 7, 2018

(30) Foreign Application Priority Data

Dec. 1, 2016 (JP) .................................. 2016-234037

(51) Int. Cl.
*G01T 1/16* (2006.01)
*G01T 3/06* (2006.01)
*G01T 1/20* (2006.01)

(52) U.S. Cl.
CPC .............. *G01T 3/06* (2013.01); *G01T 1/2002* (2013.01); *G01T 1/2018* (2013.01)

(58) Field of Classification Search
CPC ......... G01T 1/2002; G01T 3/00; G01T 3/001; G01T 3/06; G01T 3/065; G01T 3/08; G01T 3/085
See application file for complete search history.

(56) References Cited

U.S. PATENT DOCUMENTS

| 7,115,872 | B2 | 10/2006 | Bordynuik |
| 7,847,258 | B2 | 12/2010 | Yaegashi et al. |
| 9,455,302 | B2* | 9/2016 | Lee ........................ H01L 51/442 |
| 2005/0205903 | A1 | 9/2005 | Hioki |
| 2008/0128628 | A1 | 6/2008 | Moses et al. |
| 2009/0026379 | A1* | 1/2009 | Yaegashi ................ G01T 1/2018 |
| | | | 250/370.09 |
| 2009/0302226 | A1* | 12/2009 | Schieber ................... G01T 3/08 |
| | | | 250/370.02 |
| 2010/0116993 | A1 | 5/2010 | Nittoh et al. |

(Continued)

FOREIGN PATENT DOCUMENTS

| JP | 2957439 | 10/1999 |
| JP | 2005-303266 | 10/2005 |

(Continued)

*Primary Examiner* — David P Porta
*Assistant Examiner* — Mamadou Faye
(74) *Attorney, Agent, or Firm* — Oblon, McClelland, Maier & Neustadt, L.L.P.

(57) ABSTRACT

According to one embodiment, a radiation detector includes a stacked body. The stacked body includes a first scintillator layer, a first conductive layer, a second conductive layer and an organic semiconductor layer. The second conductive layer is provided between the first scintillator layer and the first conductive layer. The organic semiconductor layer is provided between the first conductive layer and the second conductive layer. The organic semiconductor layer includes a first element. The first element includes at least one selected from the group consisting of boron, gadolinium, helium, lithium, and cadmium.

20 Claims, 6 Drawing Sheets

(56) References Cited

U.S. PATENT DOCUMENTS

| | | | |
|---|---|---|---|
| 2010/0127279 A1* | 5/2010 | Takahashi | H01L 27/14676 |
| | | | 257/80 |
| 2012/0168633 A1* | 7/2012 | Tredwell | G01T 1/2018 |
| | | | 250/370.08 |
| 2014/0225094 A1* | 8/2014 | Fraboni | H01L 51/0003 |
| | | | 257/40 |
| 2015/0245807 A1 | 9/2015 | Tajima et al. | |
| 2015/0276950 A1* | 10/2015 | Bensaoula | G01T 3/08 |
| | | | 257/76 |
| 2016/0172396 A1 | 6/2016 | Masuda | |
| 2016/0266264 A1* | 9/2016 | Slaughter | G01T 3/065 |

FOREIGN PATENT DOCUMENTS

| | | |
|---|---|---|
| JP | 2011-133441 | 7/2011 |
| JP | 5235348 | 7/2013 |
| JP | 5676402 | 2/2015 |
| JP | 5710352 | 4/2015 |
| JP | 2015-165845 | 9/2015 |
| WO | WO 2008/132849 A1 | 11/2008 |
| WO | WO 2015/015700 A1 | 2/2015 |

\* cited by examiner

RADIATION DETECTOR

CROSS-REFERENCE TO RELATED APPLICATIONS

This application is based upon and claims the benefit of priority from Japanese Patent Application No. 2016-234037, filed on Dec. 1, 2016; the entire contents of which are incorporated herein by reference.

FIELD

Embodiments described herein relate generally to a radiation detector.

BACKGROUND

It is desirable to increase the sensitivity of a radiation detector.

DETAILED DESCRIPTION

Figure 1:
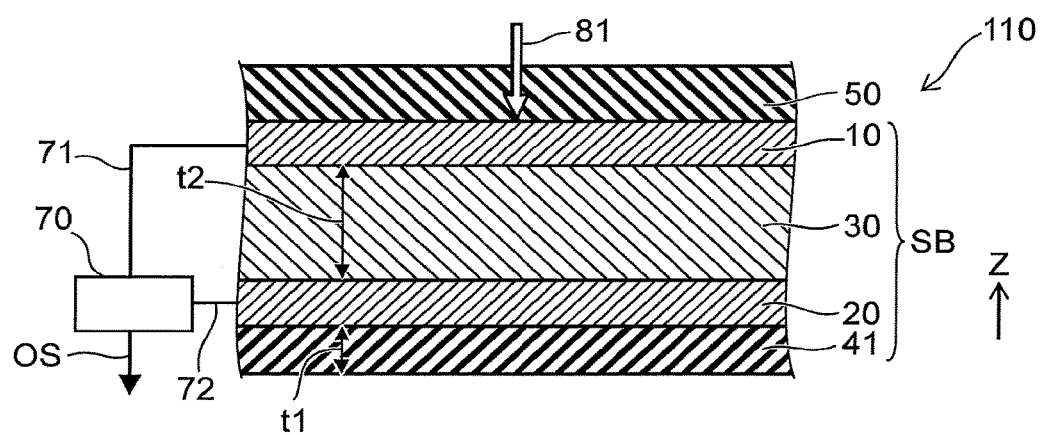
FIG. 1 is a schematic cross-sectional view illustrating a radiation detector according to a first embodiment.

According to one embodiment, a radiation detector includes a stacked body. The stacked body includes a first scintillator layer, a first conductive layer, a second conductive layer and an organic semiconductor layer. The second conductive layer is provided between the first scintillator layer and the first conductive layer. The organic semiconductor layer is provided between the first conductive layer and the second conductive layer. The organic semiconductor layer includes a first element. The first element includes at least one selected from the group consisting of boron, gadolinium, helium, lithium, and cadmium.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic cross-sectional view illustrating a radiation detector according to a first embodiment.

As shown in FIG. 1, the radiation detector 110 according to the embodiment includes a stacked body SB. The stacked body SB includes a first scintillator layer 41, a first conductive layer 10, a second conductive layer 20, and an organic semiconductor layer 30.

The second conductive layer 20 is provided between the first scintillator layer 41 and the first conductive layer 10. The organic semiconductor layer 30 is provided between the first conductive layer 10 and the second conductive layer 20. The organic semiconductor layer 30 includes a first element.

For example, the first element generates charged particles by reacting with radiation 81 that is incident on the organic semiconductor layer 30. The radiation 81 includes, for example, neutrons.

The first element includes at least one selected from the group consisting of boron, gadolinium, helium, lithium, and cadmium. The first element includes, for example, at least one selected from the group consisting of $^{10}B$, $^{157}Gd$, $^{155}Gd$, $^{3}He$, $^{6}Li$, and $^{113}Cd$. The first element may include, for example, at least one selected from the group consisting of $^{10}B$ and $^{6}Li$. The first element may include, for example, $^{10}B$.

For example, the charged particles are generated by the reaction of the first element and the neutrons when the radiation 81 (e.g., the neutrons) is incident on the stacked body SB. A first charge is generated by the charged particles in the organic semiconductor layer 30.

For example, in the case where the first element includes $^{10}B$, the charged particles that are generated are, for example, at least one of $^{7}Li$ or α particles. For example, in the case where the first element includes $^{6}Li$, the charged particles include α particles.

A portion of the charged particles (e.g., the α particles) recited above generated by the stacked body SB is incident on the first scintillator layer 41. Light is produced in the first scintillator layer 41 by the charged particles. The light is incident on the organic semiconductor layer 30. A charge (a second charge) that corresponds to the light is generated by the organic semiconductor layer 30.

For example, the charge (the first charge and the second charge) recited above is extracted when a bias voltage is applied between the first conductive layer 10 and the second conductive layer 20. For example, the amount of the extracted charge corresponds to the radiation 81 incident on the stacked body SB. An electrical signal that corresponds to the radiation 81 is obtained.

Thus, in the radiation detector 110 according to the embodiment, a charge that is based on the first element included in the organic semiconductor layer 30 and a charge that is based on the light emission of the first scintillator layer 41 are utilized.

According to the embodiment, a radiation detector can be provided in which the sensitivity can be increased.

For example, the bias voltage recited above is supplied by a detection circuit 70. The detection circuit 70 is electrically connected to the first conductive layer 10 and the second conductive layer 20. For example, the detection circuit 70 and the first conductive layer 10 are electrically connected by a first interconnect 71. For example, the detection circuit 70 and the second conductive layer 20 are electrically connected by a second interconnect 72.

For example, the potential of the first conductive layer 10 is higher than the potential of the second conductive layer 20. Thereby, for example, a negative charge (e.g., electrons) that is generated by the organic semiconductor layer 30 moves toward the first conductive layer 10. A positive charge (e.g., holes) that are generated by the organic semiconductor layer 30 move toward the second conductive layer 20. A current that corresponds to these charges flows in the interconnects. In the detection circuit 70, the current that corresponds to the charge is converted into an electrical signal (e.g., a voltage). An output signal OS that is output from the detection circuit 70 corresponds to the intensity (the amount) of the radiation 81.

The direction from the first scintillator layer 41 toward the first conductive layer 10 is taken as a first direction (a Z-axis direction). The first direction is the stacking direction of the stacked body SB. The first scintillator layer 41, the first conductive layer 10, the second conductive layer 20, and the organic semiconductor layer 30 each spread along, for example, a plane perpendicular to the first direction.

A substrate 50 is provided in the example. The substrate 50 overlaps the stacked body SB in the first direction. In the example, the first conductive layer 10, the organic semiconductor layer 30, and the second conductive layer 20 are provided between the first scintillator layer 41 and the substrate 50. For example, the substrate 50 may be flexible.

In the radiation detector 110 according to the embodiment as described above, the sensitivity can be increased by using the first scintillator layer 41 and the organic semiconductor layer 30 including the first element. However, when detecting neutrons by using the radiation detector 110, there are cases where γ-rays are detected unintentionally together with the neutrons. As a result, there are conditions under which it is difficult to detect, with high sensitivity, the neutrons that are to be detected. Such conditions will now be described.

For example, the radiation detector 110 is used to detect a substance that emits neutrons. For example, there are also cases where the radiation detector 110 is utilized for nuclear substance detection. For example, there are also cases where the radiation detector 110 is utilized as various two-dimensional neutron detectors. The two-dimensional neutron detectors include, for example, neutron transmission imaging, neutron imaging, neutron scattering experiments, etc. At the location where such neutrons are irradiated, prompt γ-rays are generated by the reaction between the neutrons and atomic nuclei. Prompt γ-rays have various energies due to the different types of atomic nuclei. Thus, prompt γ-rays exist as the background for the conditions in which the radiation detector 110 is used. Because of such conditions, it is desirable for the sensitivity to γ-rays to be low and for the sensitivity to neutrons to be high.

For example, in the case where the first scintillator layer 41 includes an inorganic scintillator (e.g., CsI(Tl), etc.), it is considered that high sensitivity to neutrons is obtained easily. The α particles that are generated by the neutrons being incident on the organic semiconductor layer 30 and reacting with the first element are converted into light by the first scintillator layer 41. This is because a high amount of light emission is obtained in the conversion more easily by an inorganic scintillator than by an organic scintillator (a plastic scintillator, etc.). Therefore, practically, it is favorable to use an inorganic scintillator.

On the other hand, in the case where the first scintillator layer 41 is an inorganic scintillator, the density of the first scintillator layer 41 is high. In the case where the density is high, the γ-rays are absorbed easily. Therefore, in the case where the sensitivity to neutrons is increased by using an inorganic scintillator, the sensitivity to γ-rays becomes high; and as a result, it is difficult to detect, with high sensitivity, the neutrons that are to be detected.

In the radiation detector 110 according to the embodiment, it was found that the sensitivity to γ-rays can be low and the sensitivity to neutrons can be high by appropriately setting the thickness (a first thickness t1 referring to FIG. 1) of the first scintillator layer 41 and the thickness (a second thickness t2 referring to FIG. 1) of the organic semiconductor layer 30. An example of the relationship between the thickness and the sensitivity will now be described.

The thickness of the second conductive layer 20 provided between the first scintillator layer 41 and the organic semiconductor layer 30 is ignored in the description hereinbelow because the thickness of the second conductive layer 20 is thin (e.g., about 50 nm) compared to the first thickness t1 and the second thickness t2.

Figure 2:
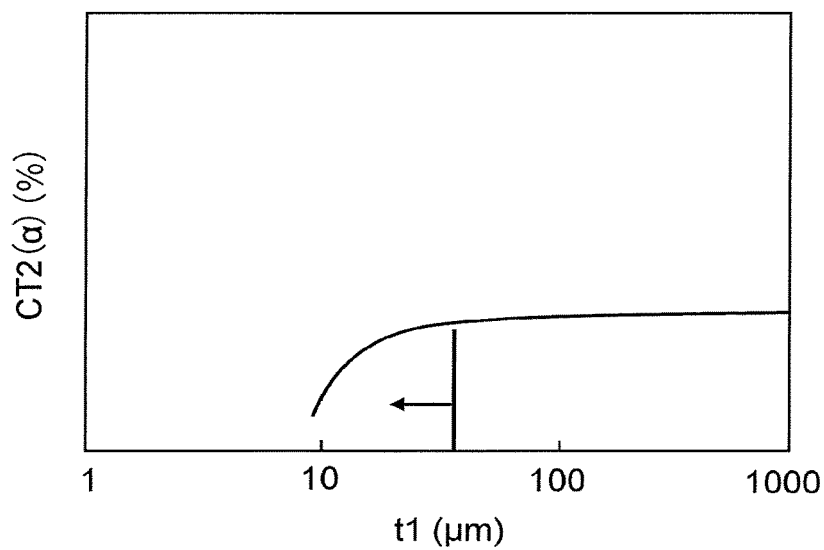
FIG. 2 is a schematic view illustrating a characteristic of the radiation detector.

FIG. 2 is a schematic view illustrating a characteristic of the radiation detector.

FIG. 2 schematically shows the detection rate of the α particles that are generated by the organic semiconductor layer 30 and detected in the first scintillator layer 41. The horizontal axis of FIG. 2 is the first thickness t1 of the first scintillator layer 41. The horizontal axis is logarithmic. The vertical axis is a detection rate CT2(α) of the α particles of the first scintillator layer 41. The detection rate CT2(α) is a normalized value.

As shown in FIG. 2, in the case where the first thickness t1 of the first scintillator layer 41 is about 20 μm or less, the detection rate CT2(α) increases as the first thickness t1 increases. However, the detection rate CT2(α) is saturated when the first thickness t1 exceeds about 20 μm.

It is considered that such a phenomenon is caused by the following. The α particles that are generated by the organic semiconductor layer 30 are incident on the first scintillator layer 41. It is considered that the penetration distance (the average) of α particles inside a solid is about 10 μm or less. Even if the first scintillator layer 41 is set to be excessively thick, such a first scintillator layer 41 is not reached by the α particles. Therefore, for example, it is considered that the detection rate CT2(α) is saturated when the first thickness t1 of the first scintillator layer 41 exceeds 20 μm.

Accordingly, it is considered that high sensitivity to the α particles generated by the neutrons is obtained when the first thickness t1 of the first scintillator layer 41 is 20 μm or less.

On the other hand, in the organic semiconductor layer 30, the α particles that are generated by the neutrons being incident are converted into a charge by the organic semiconductor layer 30. The penetration distance of the α particles is not constrained because the region of the conversion into the charge is at the location where the α particles are generated. Therefore, from the perspective of the conversion of the α particles generated by the neutrons, it is considered that the efficiency is increased by setting the second thickness t2 of the organic semiconductor layer 30 to be thick.

On the other hand, γ-rays are incident on the first scintillator layer 41 and the organic semiconductor layer 30 together with the neutrons. First, the detection rate of the γ-rays when the γ-rays are incident on the first scintillator layer 41 and the organic semiconductor layer 30 will be described.

Figure 3:
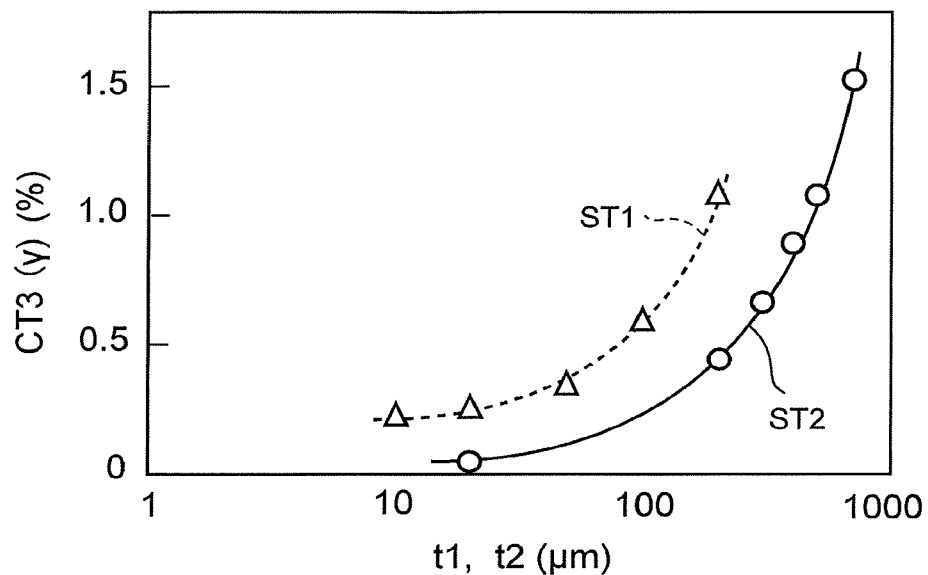
FIG. 3 is a schematic view illustrating a characteristic of the radiation detector.

FIG. 3 is a schematic view illustrating a characteristic of the radiation detector.

FIG. 3 shows simulation results of the detection rate of γ-rays in a first configuration ST1 and a second configuration ST2. Only the first scintillator layer 41 is provided in the first configuration ST1. Only the organic semiconductor layer 30 is provided in the second configuration ST2. The horizontal axis of FIG. 3 is the first thickness t1 of the first scintillator layer 41 or the second thickness t2 of the organic semiconductor layer 30. The vertical axis is a detection rate CT3(γ) of γ-rays of each layer.

As shown in FIG. 3, the detection rate CT3(γ) of γ-rays of the first configuration ST1 is higher than the detection rate CT3(γ) of γ-rays of the second configuration ST2. When the first thickness t1 exceeds 150 μm in the second configuration ST2, the detection rate CT3(γ) of γ-rays increases abruptly as the first thickness t1 increases. In the first configuration ST1, the detection rate CT3(γ) of γ-rays increases abruptly when the first thickness t1 exceeds 50 μm.

In the embodiment, the first scintillator layer 41 and the organic semiconductor layer 30 that have such characteristics are combined. As recited above, it is appropriate for the first thickness t1 of the first scintillator layer 41 to be about 10 μm to 20 μm. The detection rate of the first scintillator layer 41 and the organic semiconductor layer 30 as an entirety when the second thickness t2 of the organic semiconductor layer 30 is changed will now be described for the case where the first thickness t1 of the first scintillator layer 41 is set to these thicknesses. The γ-rays are incident together with the neutrons on the stacked body SB. The ratio of the detection rate of neutrons to the detection rate of γ-rays will now be focused upon.

Figure 4:
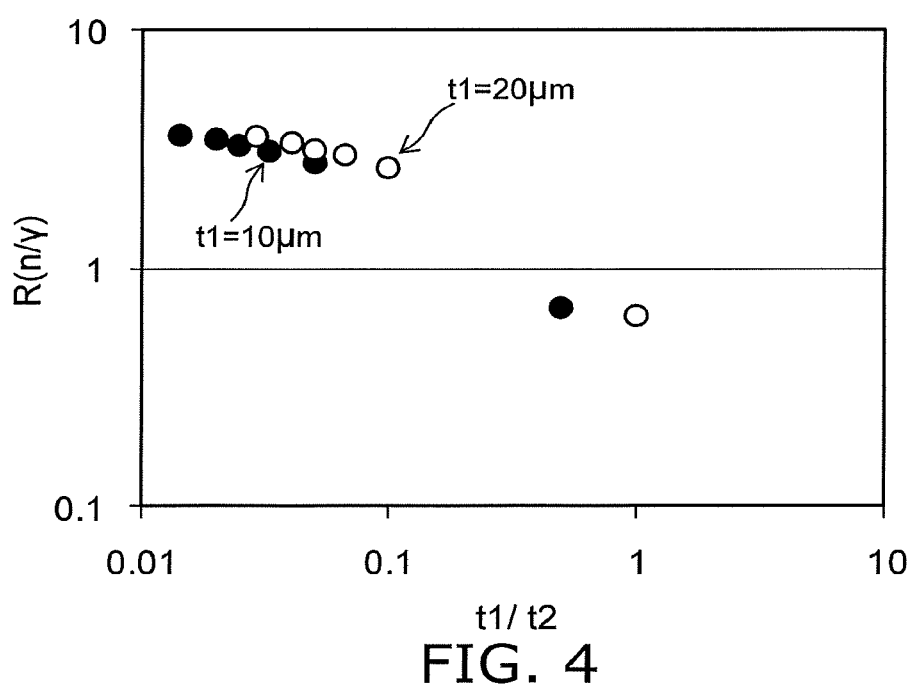
FIG. 4 is a schematic view illustrating a characteristic of the radiation detector.

FIG. 4 is a schematic view illustrating a characteristic of the radiation detector.

FIG. 4 illustrates simulation results of the detection rate of the radiation detector 110 according to the embodiment (in which the first scintillator layer 41 and the organic semiconductor layer 30 are combined). The horizontal axis of FIG. 4 is the ratio of the first thickness t1 to the second thickness t2 (a thickness ratio t1/t2). In the example, the first thickness t1 is 10 μm or 20 μm. The vertical axis is a ratio R (n/γ) of the detection rate of neutrons to the detection rate of γ-rays. When the ratio R (n/γ) is high, the neutrons can be detected more accurately without being affected by the γ-rays. The total of the detection of γ-rays in the organic semiconductor layer 30 and the detection of γ-rays in the first scintillator layer 41 contributes to the detection rate of γ-rays. In the case where the first thickness t1 is constant, a low thickness ratio t1/t2 means that the second thickness t2 of the organic semiconductor layer 30 is thick.

As shown in FIG. 4, the ratio R (n/γ) is less than 1 in the case where the thickness ratio t1/t2 is 0.5, 1, etc. In this state, the sensitivity of the detection of neutrons is lower than the sensitivity of the detection of γ-rays. In this state, it is difficult to detect the neutrons appropriately when neutrons and γ-rays exist. When the thickness ratio t1/t2 is 0.1 or less, the ratio R (n/γ) is, for example, 2 or more. In such a case, the neutrons can be detected appropriately even if neutrons and γ-rays exist.

In the embodiment, for example, the thickness ratio t1/t2 is 0.1 or less. For example, the first thickness t1 of the first scintillator layer 41 is not more than 0.1 times the second thickness t2 of the organic semiconductor layer 30. Thereby, the neutrons can be detected appropriately even in the case where neutrons and γ-rays exist.

For example, the first thickness t1 is 20 micrometers or less. The second thickness t2 is greater than 20 micrometers and not more than 1000 micrometers. In such a case, it is favorable for the thickness ratio t1/t2 to be 0.1 or less.

For example, there is a first reference example in which a neutron converter film, a CsI scintillator film, and a photoelectric conversion film are stacked in this order. In the first reference example, neutrons are incident on the neutron converter film; and α particles are generated. The α particles are incident on the CsI scintillator film; and light is produced. The light is converted into an electrical signal in the photoelectric conversion film. In the example, the neutron converter film is provided separately from the photoelectric conversion film. For example, the sensitivity is low because the neutron converter film cannot be thick.

On the other hand, there is a second reference example in which a photoelectric conversion film and a scintillator film that reacts to radiation are used. In the second reference example, it is difficult to reduce the sensitivity to γ-rays and increase the sensitivity to neutrons.

There is a third reference example in which a neutron converter film, a first electrode, a GaAs semiconductor film, and a second electrode are stacked in this order. In the third reference example, it is difficult to increase the sensitivity to neutrons because the neutron converter film cannot be thick.

In the embodiment, the first element is provided inside the organic semiconductor layer 30. The first element functions as, for example, a neutron converter. By using an organic material, it is easy to set the thickness (the second thickness t2) of the organic semiconductor layer 30 to be thick. By setting the second thickness t2 to be thick, high sensitivity to neutrons is obtained easily. Also, by using the organic material, low sensitivity to γ-rays can be maintained.

By using the first scintillator layer 41, the sensitivity to neutrons can be increased further. By setting the first thickness t1 of the first scintillator layer 41 to be thinner than the second thickness t2 of the organic semiconductor layer 30, the sensitivity to γ-rays can be markedly low. For example, the first thickness t1 is not more than 0.1 times the second thickness t2. In the embodiment, it is more favorable for the first thickness t1 to be not less than 0.01 times the second thickness t2. Thereby, for example, the sensitivity to γ-rays is suppressed to be low.

The first element may exist as a compound in the organic semiconductor layer 30. The first element may be bonded to an organic semiconductor compound in the organic semiconductor layer 30. For example, the first element may be embedded in the molecular structure of the organic semiconductor compound. For example, several kind of particles that include the first element may be provided in the organic semiconductor layer 30. For example, an organic semiconductor compound is provided around the several kind of particles. The several kind of particles may be dispersed in the organic semiconductor compound.

For example, the first element is boron. In such a case, the organic semiconductor layer 30 may include, for example, carborane. Carborane has a molecular skeleton including boron.

In the embodiment, the first scintillator layer 41 includes, for example, at least one selected from the group consisting of sodium, iodine, thallium, cesium, fluorine, barium, lutetium, cerium, europium, chlorine, terbium, strontium, bromine, potassium, yttrium, zinc, sulfur, silver, and oxygen. The first scintillator layer 41 includes, for example, iodine and cesium. The first scintillator layer 41 may include, for example, CsI(Tl), etc.

For example, the density of the first scintillator layer 41 is higher than the density of the organic semiconductor layer 30. For example, the density of the first scintillator layer 41 is not less than 2 g/cm$^3$ and not more than 7 g/cm$^3$. The density of the organic semiconductor layer 30 is not less than 0.7 g/cm$^3$ but less than 2 g/cm$^3$. For example, the neutrons can be detected appropriately even in the case where neutrons and γ-rays exist by using two layers having such a difference and by appropriately setting the thicknesses of the two layers.

In the radiation detector 110, for example, the radiation 81 (e.g., the neutrons) is incident on the stacked body SB from the first conductive layer 10 side (referring to FIG. 1). A portion of the radiation 81 is converted into a charge by the first element in the organic semiconductor layer 30. Another portion of the radiation 81 passes through the organic semiconductor layer 30 and the second conductive layer 20 and is incident on the first scintillator layer 41. As described below, the radiation 81 (e.g., the neutrons) may be incident on the stacked body SB from the second conductive layer 20 side.

Figure 5:
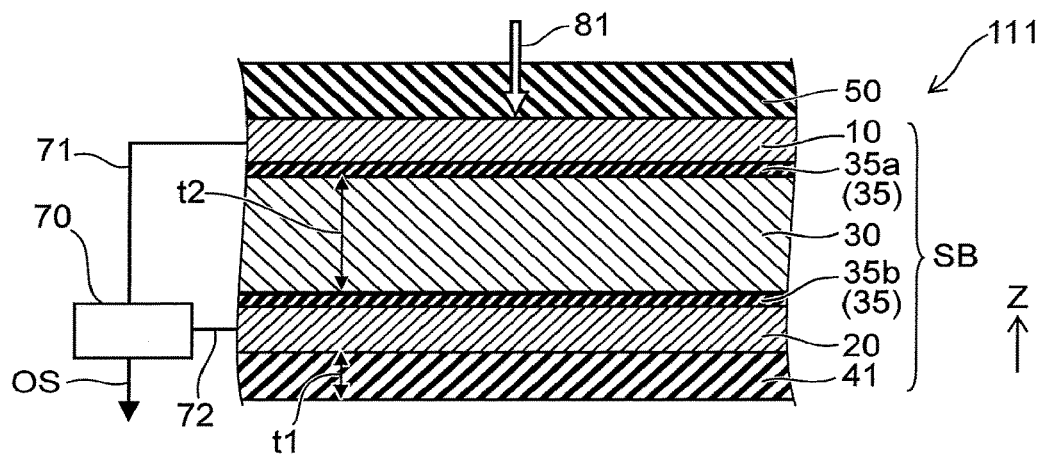
FIG. 5 is a schematic cross-sectional view illustrating another radiation detector according to the first embodiment.

FIG. 5 is a schematic cross-sectional view illustrating another radiation detector according to the first embodiment.

As shown in FIG. 5, the other radiation detector 111 according to the embodiment includes an organic film 35. Otherwise, the radiation detector 111 is similar to the radiation detector 110.

The organic film 35 is provided in at least one of a first position between the first conductive layer 10 and the organic semiconductor layer 30 or a second position between the second conductive layer 20 and the organic semiconductor layer 30. In the example, the organic film 35 includes a first organic film 35a and a second organic film 35b. The first organic film 35a is provided between the first conductive layer 10 and the organic semiconductor layer 30. The second organic film 35b is provided between the second conductive layer 20 and the organic semiconductor layer 30.

The first organic film 35a includes, for example, an electron-accepting material. The electron-accepting material includes, for example, a triazole compound, etc. Examples of the material of the first organic film 35a are described below. The thickness of the first organic film 35a is, for example, not less than 50 nm and not more than 100 nm.

The first organic film 35a may function as, for example, a hole blocking film. For example, the first organic film 35a suppresses the injection of holes from the first conductive layer 10 into the organic semiconductor layer 30 when a bias voltage is applied. For example, dark current is suppressed.

The second organic film 35b includes, for example, an electron-donating organic material. The electron-donating organic material includes, for example, an aromatic diamine compound, etc. Examples of the material of the second organic film 35b are described below. The thickness of the second organic film 35b is, for example, not less than 50 nm and not more than 100 nm.

The second organic film 35b may function as, for example, an electron blocking film. For example, the second organic film 35b suppresses the injection of electrons from the second conductive layer 20 into the organic semiconductor layer 30 when a bias voltage is applied. For example, dark current is suppressed.

By providing the organic film 35, for example, dark current can be suppressed. High sensitivity is obtained.

Figure 6:
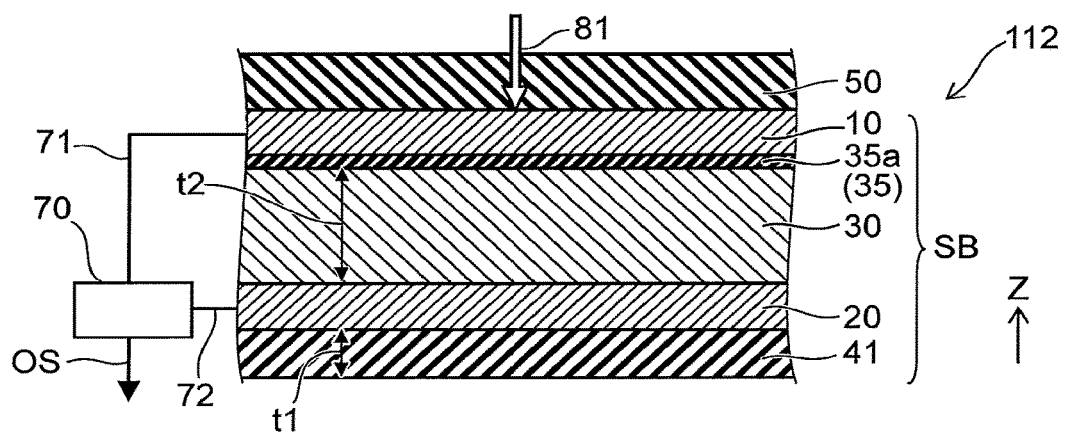
FIG. 6 is a schematic cross-sectional view illustrating another radiation detector according to the first embodiment.

FIG. 6 is a schematic cross-sectional view illustrating another radiation detector according to the first embodiment.

As shown in FIG. 6, the other radiation detector 112 according to the embodiment includes the first organic film 35a (the organic film 35). Otherwise, the radiation detector 112 is similar to the radiation detector 110.

Figure 7:
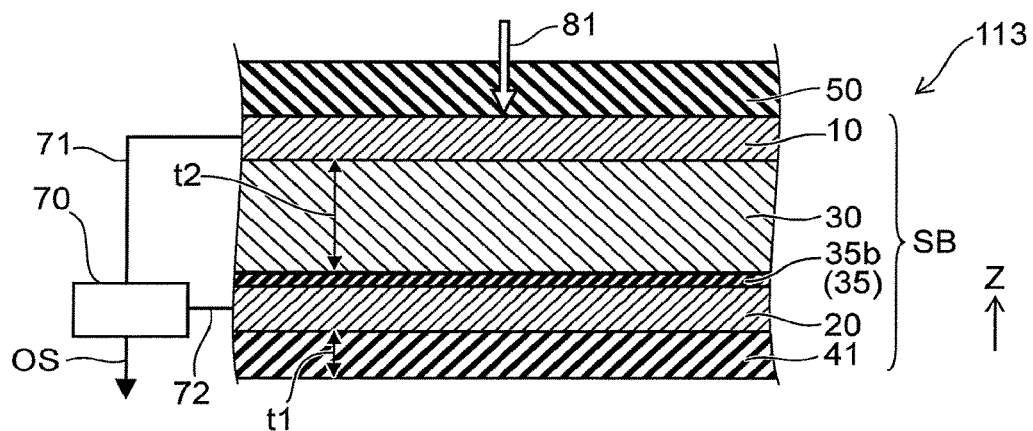
FIG. 7 is a schematic cross-sectional view illustrating another radiation detector according to the first embodiment.

FIG. 7 is a schematic cross-sectional view illustrating another radiation detector according to the first embodiment.

As shown in FIG. 7, the other radiation detector 113 according to the embodiment includes the second organic film 35b (the organic film 35). Otherwise, the radiation detector 113 is similar to the radiation detector 110.

In the radiation detectors 112 and 113 as well, for example, the dark current can be suppressed. High sensitivity is obtained.

Figure 8:
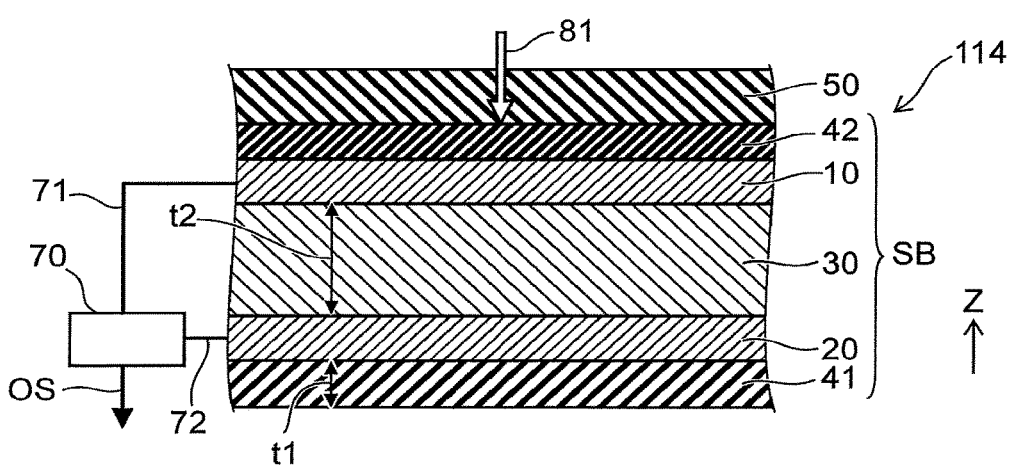
FIG. 8 is a schematic cross-sectional view illustrating another radiation detector according to the first embodiment.

FIG. 8 is a schematic cross-sectional view illustrating another radiation detector according to the first embodiment.

As shown in FIG. 8, the other radiation detector 114 according to the embodiment includes a second scintillator layer 42. Otherwise, the radiation detector 114 is similar to the radiation detector 110.

The first conductive layer 10, the second conductive layer 20, and the organic semiconductor layer 30 are provided between the first scintillator layer 41 and the second scintillator layer 42. For example, the second scintillator layer 42 is included in the stacked body SB. For example, charged particles are generated by a reaction between the neutrons and the first element in the organic semiconductor layer 30. The charged particles are incident on the second scintillator layer 42; and light is emitted in the second scintillator layer 42. The light is converted into a charge in the organic semiconductor layer 30. High sensitivity is obtained in the radiation detector 114.

Figure 9:
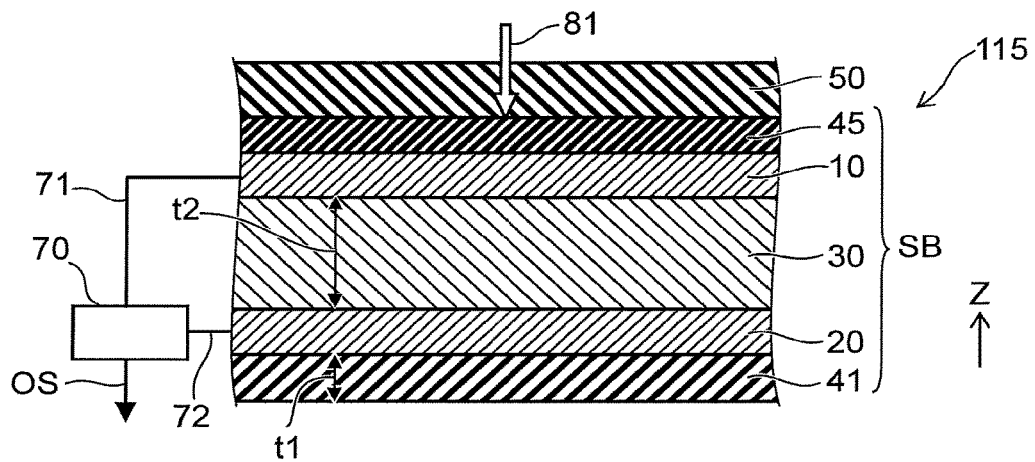
FIG. 9 is a schematic cross-sectional view illustrating another radiation detector according to the first embodiment.

FIG. 9 is a schematic cross-sectional view illustrating another radiation detector according to the first embodiment.

As shown in FIG. 9, the other radiation detector 115 according to the embodiment includes an optical layer 45. Otherwise, the radiation detector 115 is similar to the radiation detector 110.

The first conductive layer 10, the second conductive layer 20, and the organic semiconductor layer 30 are provided between the first scintillator layer 41 and the optical layer 45. For example, the optical layer 45 is included in the stacked body SB. The optical layer 45 functions as, for example, a light reflecting layer.

For example, light is emitted from the first scintillator layer 41 when the radiation 81 is incident on the first scintillator layer 41. The first reflectance of the optical layer 45 to the peak wavelength of the light is higher than the second reflectance of the second conductive layer 20 to the peak wavelength. For example, the light passes through the second conductive layer 20 and is incident on the organic semiconductor layer 30. A portion of the light undergoes photoelectric conversion. There are cases where a portion of light passes through the organic semiconductor layer 30 and passes through the first conductive layer 10. This portion of the light is reflected by the optical layer 45. The light returns to the organic semiconductor layer 30 and undergoes photoelectric conversion. High sensitivity is obtained.

At least one selected from the group consisting of aluminum, barium sulfate, magnesium oxide, aluminum oxide, and titanium oxide is used as the optical layer 45. The optical layer 45 transmits the radiation 81.

Figure 10:
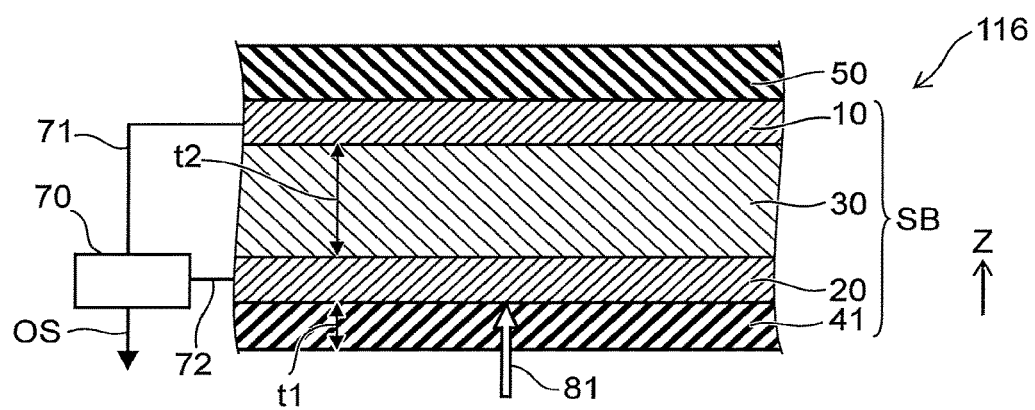
FIG. 10 is a schematic cross-sectional view illustrating another radiation detector according to the first embodiment.

FIG. 10 is a schematic cross-sectional view illustrating another radiation detector according to the first embodiment.

As shown in FIG. 10, in the other radiation detector 116 according to the embodiment as well, the stacked body SB includes the first scintillator layer 41, the first conductive layer 10, the second conductive layer 20, and the organic semiconductor layer 30. In the radiation detector 116, the radiation 81 is incident on the stacked body SB from the first scintillator layer 41 side. In the radiation detector 116 as well, high sensitivity is obtained.

Second Embodiment

Figure 11:
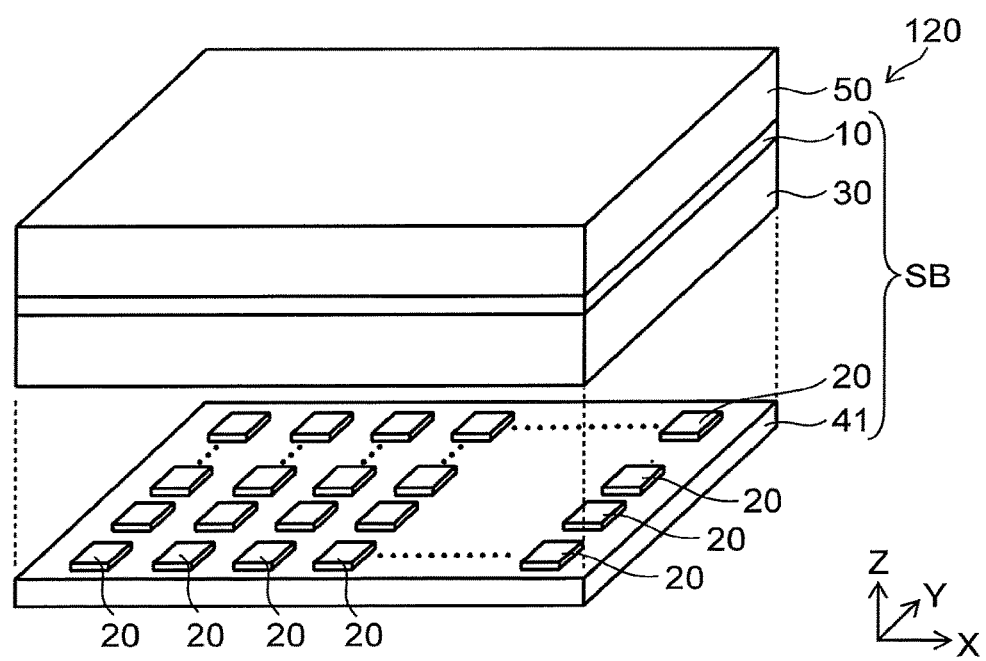
FIG. 11 is a schematic perspective view illustrating a radiation detector according to a second embodiment.

FIG. 11 is a schematic perspective view illustrating a radiation detector according to a second embodiment.

As shown in FIG. 11, the radiation detector 120 includes the stacked body SB. The stacked body SB includes the first scintillator layer 41, the first conductive layer 10, the second conductive layer 20, and the organic semiconductor layer 30. The substrate 50 is provided in the example. In FIG. 11, a portion of the components included in the radiation detector 120 are drawn as being separated from each other for easier viewing of the drawing.

The second conductive layer 20 is multiply provided in the radiation detector 120. The multiple second conductive layers 20 are arranged along a plane (e.g., the X-Y plane) crossing the first direction (the Z-axis direction) from the first scintillator layer 41 toward the first conductive layer 10. The X-Y plane is perpendicular to the Z-axis direction.

The multiple second conductive layers 20 are arranged along, for example, an X-axis direction and a Y-axis direction. For example, the multiple second conductive layers 20 are arranged in a matrix configuration.

An image that corresponds to the radiation 81 is obtained in the radiation detector 120. The configurations described in reference to the first embodiment and modifications of the configurations are applicable to the radiation detector 120. According to the radiation detector 120 as well, a radiation detector can be provided in which the sensitivity can be increased.

Examples of materials used in the embodiments will now be described.

The organic semiconductor layer 30 includes, for example, an n-type semiconductor region and a p-type semiconductor region. For example, the two regions may be mixed. For example, the organic semiconductor layer 30 may have, for example, a bulk heterojunction structure. For example, a high photoelectric conversion efficiency is obtained by using the bulk heterojunction structure. Multiple n-type semiconductor regions and multiple p-type semiconductor regions may be arranged alternately in the organic semiconductor layer 30. A conductive region may be provided between one n-type semiconductor region and one p-type semiconductor region. The conductive region includes, for example, at least one selected from the group consisting of silver and gold.

For example, the p-type semiconductor region includes a p-type semiconductor compound. The p-type semiconductor compound is, for example, a hole-transport organic compound. The p-type semiconductor compound is, for example, a donor compound. For example, the p-type semiconductor compound easily donates electrons. For example, the ionization potential of the p-type semiconductor compound is small. The p-type semiconductor compound is, for example, electron-donating.

The p-type semiconductor compound includes, for example, at least one selected from the group consisting of a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a condensed aromatic carbocyclic compound, and a metal complex. The condensed aromatic carbocyclic compound recited above includes, for example, at least one selected from the group consisting of a naphthalene derivative, an anthracene derivative, a phenanthrene derivative, a tetracene derivative, a pyrene derivative, a perylene derivative, and a fluoranthene derivative. The metal complex recited above includes a nitrogen-containing heterocyclic compound as a ligand.

For example, the n-type semiconductor region includes an n-type semiconductor compound. The n-type semiconductor compound is, for example, an electron-transport organic compound. The n-type semiconductor compound is, for example, an acceptor compound. For example, the n-type semiconductor compound easily accepts electrons. For example, the electron affinity of the n-type semiconductor compound is large.

The n-type semiconductor compound includes, for example, at least one selected from the group consisting of a condensed aromatic carbocyclic compound, a heterocyclic compound, a polyarylene compound, a fluorene compound, a cyclopentadiene compound, a silyl compound, and a metal complex. The condensed aromatic carbocyclic compound recited above includes, for example, at least one selected from the group consisting of a naphthalene derivative, an anthracene derivative, a phenanthrene derivative, a tetracene derivative, a pyrene derivative, a perylene derivative, and a fluoranthene derivative. The heterocyclic compound recited above includes, for example, a nitrogen atom, an oxygen atom, and a sulfur atom. The heterocyclic compound recited above is, for example, five-membered to seven-membered. The heterocyclic compound recited above includes, for example, at least one selected from the group consisting of pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazol, benzothiazole, carbazole, purine, triazolopyridazine, triazolopyrimidine, tetrazaindene, oxadiazole, imidazopyridine, pyrrolidine, pyrrolopyridine, thiadiazolopyridine, dibenzazepine, and tribenzazepine. The metal complex recited above includes, for example, a nitrogen-containing heterocyclic compound as a ligand.

At least one of the p-type semiconductor compound or the n-type semiconductor compound may include a dye. The dye includes, for example, at least one selected from the group consisting of a cyanine dye, a styryl dye, a hemicyanine dye, a merocyanine dye, a trinuclear merocyanine dye, a tetranuclear merocyanine dye, a rhodacyanine dye, a complex cyanine dye, a complex merocyanine dye, an allopolar dye, an oxonol dye, a hemioxonol dye, a squarylium dye, a croconium dye, an azamethine dye, a coumarin dye, an arylidene dye, an anthraquinone dye, a triphenylmethane dye, an azo dye, an azomethine dye, a spiro compound, a metallocene dye, a fluorenone dye, a fulgide dye, a perylene dye, a phenazine dye, a phenothiazine dye, a quinone dye, an indigo dye, a diphenylmethane dye, a polyene dye, an acridine dye, an acridinone dye, a diphenylamine dye, a quinacridone dye, a quinophthalone dye, a phenoxazine dye, a phthaloperylene dye, a porphyrin dye, a chlorophyll dye, a phthalocyanine dye, a metal complex dye, and a condensed aromatic carbocyclic dye. The merocyanine dye recited above includes, for example, zeromethine-merocyanine (simple merocyanine). The metal complex dye recited above includes, for example, at least one selected from the group consisting of a naphthalene derivative, an anthracene derivative, a phenanthrene derivative, a tetracene derivative, a pyrene derivative, a perylene derivative, and a fluoranthene derivative.

The metal complex recited above includes, for example, a ligand. The ligand is coordinated to the metal. The ligand includes at least one of a nitrogen atom, an oxygen atom, or a sulfur atom. The metal ion inside the metal complex includes, for example, at least one selected from the group consisting of a beryllium ion, a magnesium ion, an aluminum ion, a gallium ion, a zinc ion, an indium ion, and a tin ion. The metal ion inside the metal complex may include, for example, at least one selected from the group consisting of a beryllium ion, an aluminum ion, a gallium ion, and a zinc ion. The metal ion inside the metal complex may include, for example, at least one selected from the group consisting of an aluminum ion and a zinc ion.

The ligand includes, for example, a nitrogen-containing heterocyclic ligand. The number of carbons in the nitrogen-containing heterocyclic ligand is, for example, not less than 1 and not more than 30. The number of carbons in the nitrogen-containing heterocyclic ligand may be, for example, not less than 2 and not more than 20; and the number of carbons in the nitrogen-containing heterocyclic ligand may be, for example, not less than 3 and not more than 15. The ligand may be a monodentate ligand. The ligand may be, for example, a bidentate or higher ligand.

The ligand includes, for example, at least one selected from the group consisting of a pyridine ligand, a bipyridyl ligand, a quinolinol ligand, and a hydroxyphenylazole ligand. The hydroxyphenylazole ligand includes, for example, at least one selected from the group consisting of hydroxyphenylbenzimidazole, a hydroxyphenylbenzoxazole ligand, and a hydroxyphenylimidazole ligand.

The ligand includes, for example, an alkoxy ligand. The number of carbons in the alkoxy ligand is, for example, not less than 1 and not more than 30. The number of carbons in the alkoxy ligand may be, for example, not less than 1 and not more than 20. The number of carbons in the alkoxy ligand may be, for example, not less than 1 and not more than 10. The alkoxy ligand includes, for example, at least one selected from the group consisting of methoxy, ethoxy, butoxy, and 2-ethylhexyloxy.

The ligand includes, for example, an aryloxy ligand. The number of carbons in the aryloxy ligand is, for example, not less than 6 and not more than 30. The number of carbons in the aryloxy ligand may be, for example, not less than 6 and not more than 20. The number of carbons in the aryloxy ligand may be, for example, not less than 6 and not more than 12. The aryloxy ligand includes, for example, at least one selected from the group consisting of phenyloxy, 1-naphthyloxy, 2-naphthyloxy, 2,4,6-trimethylphenyloxy, and 4-biphenyloxy.

The ligand includes, for example, a heteroaryloxy ligand. The number of carbons in the heteroaryloxy ligand is, for example, not less than 1 and not more than 30. The number of carbons in the heteroaryloxy ligand is, for example, not less than 1 and not more than 20. The number of carbons in the heteroaryloxy ligand is, for example, not less than 1 and not more than 12. The heteroaryloxy ligand includes, for example, at least one selected from the group consisting of pyridyloxy, pyrazyloxy, pyrimidyloxy, and quinolyloxy.

The ligand includes, for example, an alkylthio ligand. The number of carbons in the alkylthio ligand is, for example, not less than 1 and not more than 30. The number of carbons in the alkylthio ligand may be, for example, not less than 1 and not more than 20. The number of carbons in the alkylthio ligand is, for example, not less than 1 and not more than 12. The alkylthio ligand includes, for example, at least one selected from the group consisting of methylthio and ethylthio.

The ligand includes, for example, an arylthio ligand. The number of carbons in the arylthio ligand is, for example, not less than 6 and not more than 30. The number of carbons in the arylthio ligand may be, for example, not less than 6 and not more than 20. The number of carbons in the arylthio ligand may be, for example, not less than 6 and not more than 12. The arylthio ligand includes, for example, phenylthio.

The ligand includes, for example, a heterocyclic-substituted thio ligand. The number of carbons in the heterocyclic-substituted thio ligand is, for example, not less than 1 and not more than 30. The number of carbons in the heterocyclic-substituted thio ligand may be, for example, not less than 1 and not more than 20. The number of carbons in the heterocyclic-substituted thio ligand may be, for example, not less than 1 and not more than 12. The heterocyclic-substituted thio ligand includes, for example, at least one selected from the group consisting of pyridylthio, 2-benzimizolylthio, 2-benzoxazolylthio, and 2-benzothiazolylthio.

The ligand includes, for example, a siloxy ligand. The number of carbons in the siloxy ligand is, for example, not less than 1 and not more than 30. The number of carbons in the siloxy ligand may be, for example, not less than 3 and not more than 25. The number of carbons in the siloxy ligand may be, for example, not less than 6 and not more than 20. The siloxy ligand includes, for example, at least one selected from the group consisting of a triphenylsiloxy group, a triethoxysiloxy group, and a triisopropylsiloxy group.

The ligand includes, for example, at least one selected from the group consisting of a nitrogen-containing heterocyclic ligand, an aryloxy ligand, a heteroaryloxy group, and a siloxy ligand. The ligand includes, for example, at least one selected from the group consisting of a nitrogen-containing heterocyclic ligand, an aryloxy ligand, and a siloxy ligand.

The second conductive layer 20 is light-transmissive. The thickness of the second conductive layer 20 is, for example, not less than 30 nm and not more than 300 nm. The second conductive layer 20 includes, for example, at least one selected from the group consisting of ITO, IZO, AZO, FTO, $SnO_2$, $TiO_2$, and $ZnO_2$. The second conductive layer 20 may include, for example, a metal film. The metal film includes, for example, at least one selected from the group consisting of aluminum, silver, and Au.

The first conductive layer 10 includes, for example, at least one selected from the group consisting of Al, Ag, Au, and Ni. The thickness of the first conductive layer 10 is, for example, not less than 50 nm and not more than 10 μm.

The first organic film 35a includes, for example, an electron-accepting organic material. The electron-accepting material includes, for example, at least one selected from the group consisting of fullerene and a carbon nanotube. The electron-accepting material may include, for example, a derivative of these substances. Fullerene includes, for example, at least one of $C_{60}$ or $C_{70}$. The electron-accepting material may include, for example, at least one selected from the group consisting of an oxadiazole derivative, an anthraquinodimethane derivative, a diphenylquinone derivative, bathocuproine, and bathophenanthroline. The electron-accepting material may include a derivative of these substances. The electron-accepting material may include at least one selected from the group consisting of a triazole compound, a tris(8-hydroxyquinolinato)aluminum complex, a bis(4-methyl-8-quinolinato)aluminum complex, a distyrylarylene derivative, and a silole compound.

The thickness of the first organic film 35a is, for example, not less than 10 nm and not more than 200 nm. For example, dark current can be suppressed effectively. The thickness of the first organic film 35a may be, for example, not less than 30 nm and not more than 150 nm. The thickness of the first organic film 35a may be, for example, not less than 50 nm and not more than 100 nm.

For example, the ionization potential of the first organic film 35a is larger than the work function of the first conductive layer 10. The difference between the ionization potential of the first organic film 35a and the work function of the first conductive layer 10 is, for example, not less than 1.3 eV.

For example, the electron affinity of the first organic film 35a is not less than the electron affinity of the organic semiconductor layer 30.

The second organic film 35b includes, for example, an electron-donating organic material. The electron-donating organic material includes, for example, a low molecular-weight material. The low molecular-weight material includes, for example, at least one selected from the group consisting of an aromatic diamine compound, oxazole, oxadiazole, triazole, imidazole, imidazolone, a stilbene derivative, a pyrazoline derivative, tetrahydroimidazole, polyaryl alkane, butadiene, 4,4'4''-tris(N-(3-methyl phenyl) N-phenylamino)triphenylamine (m-MTDATA), a porphyrin compound, a riazole derivative, an oxadiazole derivative, an imidazole derivative, a polyaryl alkane derivative, a pyrazoline derivative, a pyrazolone derivative, a phenylenediamine derivative, an arylamine derivative, an amino-substituted chalcone derivative, an oxazole derivative, a styrylanthracene derivative, a fluorenone derivative, a hydrazone derivative, and a silazane derivative. The aromatic diamine compound recited above includes, for example, at least one selected from the group consisting of N,N'-bis(3-methyl phenyl)-(1,1'-biphenyl)-4,4'-diamine (TPD) and 4,4'-bis(N-(naphthyl)-N-phenyl-amino)biphenyl (α-NPD). The porphyrin compound recited above includes, for example, at least one selected from the group consisting of porphyrin, tetraphenylporphine-copper, phthalocyanine, copper phthalocyanine, and titanium phthalocyanine oxide.

The electron-donating organic material includes, for example, a high polymer material. The high polymer material includes, for example, at least one selected from the group consisting of phenylene vinylene, fluorene, carbazole, indole, pyrene, pyrrole, picoline, thiophene, acetylene, and diacetylene. The high polymer material may include a derivative of these substances.

For example, the electron affinity of the second organic film 35b is larger than the work function of the second conductive layer 20. The difference between the electron affinity of the second organic film 35b and the work function of the second conductive layer 20 is, for example, not less than 1.3 eV. The ionization potential of the second organic film 35b is not more than the ionization potential of the organic semiconductor layer 30.

The thickness of the second organic film 35b is, for example, not less than 10 nm and not more than 200 nm. The dark current is suppressed effectively. The thickness of the second organic film 35b may be, for example, not less than 30 nm and not more than 150 nm. The thickness of the second organic film 35b may be, for example, not less than 50 nm and not more than 100 nm.

According to the embodiments, a radiation detector can be provided in which the sensitivity can be increased.

In this specification, the "state of being electrically connected" includes the state in which multiple conductive bodies are physically in contact, and a current flows between the multiple conductive bodies. The "state of being electrically connected" includes the state in which another conductive body is inserted between multiple conductive bodies, and a current flows between the multiple conductive bodies.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in radiation detectors such as scintillator layers, conductive layers, organic semiconductor layers, first elements, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all radiation detectors practicable by an appropriate design modification by one skilled in the art based on the radiation detectors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A radiation detector, comprising:
a stacked body comprising
  a first scintillator layer,
  a first conductive layer,
  a second conductive layer provided between the first scintillator layer and the first conductive layer, and
  an organic semiconductor layer comprising a first element and being provided between the first conductive layer and the second conductive layer, the first element comprising at least one selected from the group consisting of boron, gadolinium, helium, lithium, and cadmium,
wherein
a density of the first scintillator layer is higher than a density of the organic semiconductor layer, and
a ratio (t1/t2) of a first thickness of the first scintillator layer (t1) to a second thickness of the organic semiconductor layer (t2) is 0.1 or less.
2. The detector according to claim 1, wherein
the first thickness is 20 micrometers or less, and the second thickness is greater than 20 micrometers and not more than 1000 micrometers.

3. The detector according to claim 1, wherein
the density of the first scintillator layer is not less than 2 g/cm$^3$ and not more than 7 g/cm$^3$, and
the density of the organic semiconductor layer is not less than 0.7 g/cm$^3$ but less than 2 g/cm$^3$.

4. The detector according to claim 1, wherein the first scintillator layer comprises at least one selected from the group consisting of sodium, iodine, thallium, cesium, fluorine, barium, lutetium, cerium, europium, chlorine, terbium, strontium, bromine, potassium, yttrium, zinc, sulfur, silver, and oxygen.

5. The detector according to claim 1, wherein the first scintillator layer comprises an inorganic scintillator.

6. The detector according to claim 1, wherein the first element comprises at least one selected from the group consisting of $^{10}$B, $^{157}$Gd, $^{155}$Gd, $^{3}$He, $^{6}$Li and $^{113}$Cd.

7. The detector according to claim 1, further comprising an organic film provided in at least one of a first position between the first conductive layer and the organic semiconductor layer or a second position between the second conductive layer and the organic semiconductor layer.

8. The detector according to claim 1, wherein
the stacked body further comprises a second scintillator layer,
the first conductive layer, the second conductive layer, and the organic semiconductor layer being between the first scintillator layer and the second scintillator layer.

9. The detector according to claim 1, wherein
the stacked body further comprises an optical layer,
the first conductive layer, the second conductive layer, and the organic semiconductor layer are between the first scintillator layer and the optical layer, and
a first reflectance of the optical layer to a peak wavelength of light emitted from the first scintillator layer when radiation is incident on the first scintillator layer is higher than a second reflectance of the second conductive layer to the peak wavelength.

10. The detector according to claim 1, further comprising a detection circuit electrically connected to the first conductive layer and the second conductive layer,
the detection circuit outputting a signal corresponding to an intensity of radiation incident on the stacked body.

11. The detector according to claim 1, wherein the first element comprises at least one selected from the group consisting of $^{10}$B and $^{6}$Li.

12. The detector according to claim 1, wherein the first element comprises $^{10}$B.

13. The detector according to claim 1, wherein
a first charge and a second charge are detected,
the first charge is generated by charged particles generated by a reaction between the first element and neutrons when the neutrons are incident on the stacked body, and
the second charge is generated by the organic semiconductor layer absorbing light produced by the first scintillator layer.

14. The detector according to claim 13, wherein the light is produced by a portion of the charged particles being incident on the first scintillator layer.

15. The detector according to claim 1, wherein the first element generates charged particles by reacting with neutrons incident on the organic semiconductor layer.

16. The detector according to claim 1, wherein the organic semiconductor layer comprises an n-type semiconductor region and a p-type semiconductor region.

17. The detector according to claim 1, wherein the second conductive layer is light-transmissive.

18. The detector according to claim 1, wherein
the second conductive layer is provided in a plurality, and
the plurality of second conductive layers are arranged along a plane crossing a first direction, the first direction being from the first scintillator layer toward the first conductive layer.

19. The detector according to claim 1, further comprising a substrate,
the substrate being flexible,
the substrate overlapping the stacked body in a first direction,
the first direction being from the first scintillator layer toward the first conductive layer.

20. The detector according to claim 1, wherein a ratio R(n/γ) of a detection rate of neutrons to a detection rate of γ-rays is 2 or more.

* * * * *